United States Patent [19]

Hall, Jr.

[11] 3,836,232
[45] Sept. 17, 1974

[54] MULTIPLE CHANNEL OPTICAL SYSTEM

[75] Inventor: Joseph F. Hall, Jr., Santa Ana, Calif.

[73] Assignee: The United States of America as represented by the Secretary of the Navy, Washington, D.C.

[22] Filed: Feb. 2, 1973

[21] Appl. No.: 329,241

[52] U.S. Cl. .............................. 350/174, 350/173
[51] Int. Cl. ............................................ G02b 27/14
[58] Field of Search ............. 350/173, 174; 356/251

[56] References Cited
UNITED STATES PATENTS

| | | | |
|---|---|---|---|
| 2,106,752 | 2/1938 | Land | 350/173 X |
| 2,858,731 | 11/1958 | Rehorn | 350/174 X |
| 3,706,487 | 12/1972 | LaForgia | 350/174 X |
| 3,732,428 | 5/1973 | Spangler | 350/174 |
| 1,989,317 | 1/1935 | Harper | 350/173 |

Attorney, Agent, or Firm—R. S. Sciascia; G. J. Rubens; John W. McLaren

[57] ABSTRACT

First and second prisms of material substantially transparent to light transmission are positioned in a common diagonally disposed planar interface, preferably comprising an extremely small air space, to form a composite cubic optic element. Visual information from a first channel is directed to the cubic optical element at an angle such that it passes directly through the cubic optical element, including its diagonally disposed planar interface, without reflection. Visual information from a second channel is directed to an adjacent face of the cubic optical element at such an angle relative to the diagonally disposed planar interface as to cause its total internal reflection and consequent redirection along the same axis as the visual information from the first channel, thereby combining the visual information from both channels without undue loss of light energy.

6 Claims, 2 Drawing Figures

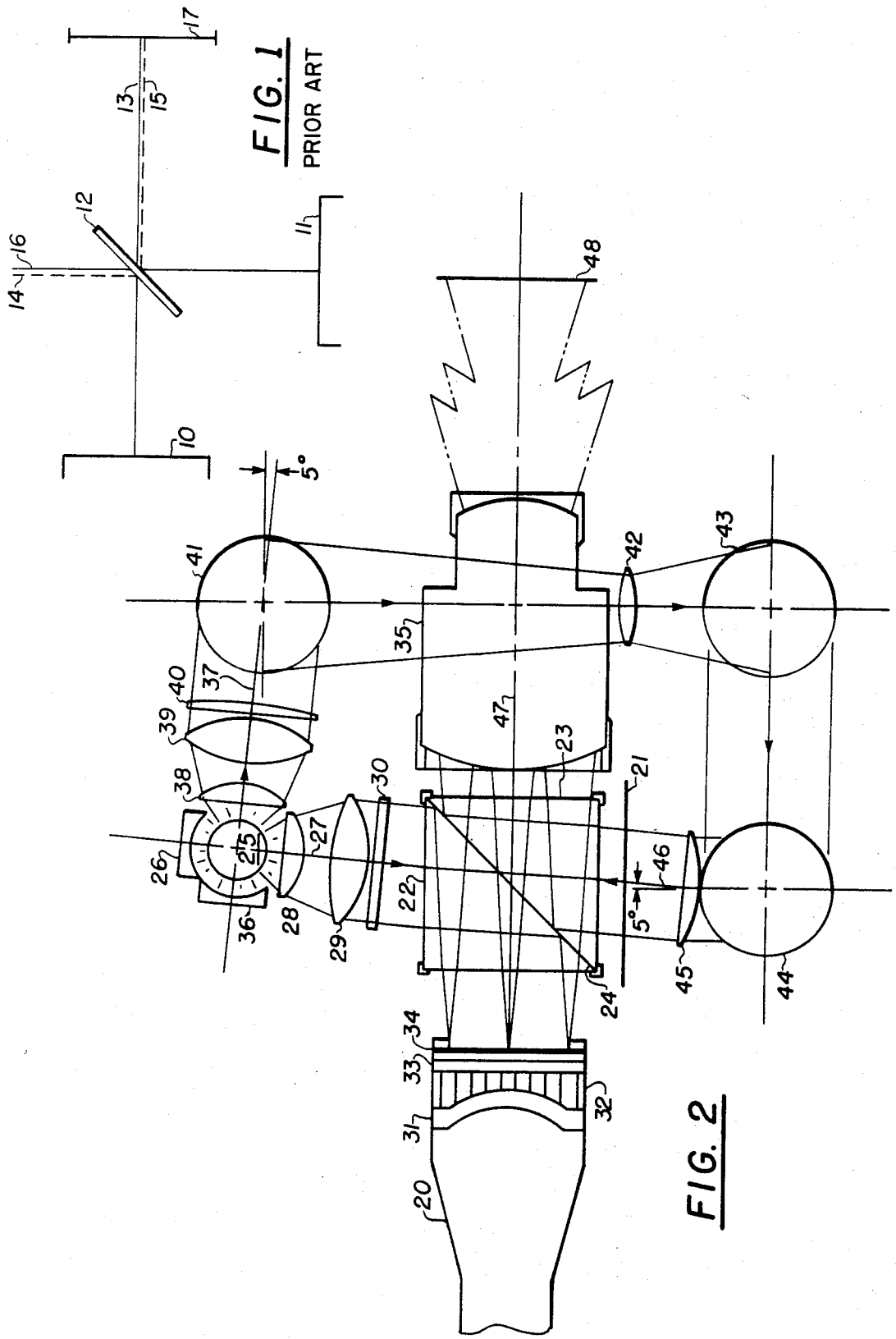

MULTIPLE CHANNEL OPTICAL SYSTEM

BACKGROUND OF THE INVENTION

There are numerous requirements for combining visual information such as may be contained in first and second channels. Typical of such requirement is the Navy Tactical Data System which, in one of its visual presentations, combines visual information of a static source, such as a map, for example, with the dynamic tactical information such as may be derived from radar systems or analogous sources. The information in visual form from first and second channels is combined and projected to form a large screen display for command information, interpretation, and suitable operational actions.

Conventionally, the desired combining of first and second channels of visual information can be accomplished by "beam splitter" techniques and elements suitably arranged to produce the required combined ultimate result. Conventional beam splitters usually comprise a semi-reflective element which receives visual information directed at an appropriate angle, such as a 45° angle, for example, permitting half of the light energy containing the original information to pass through, while the other half of the light energy containing the same visual information is reflected and redirected away from the semi-reflective element at the same angle, which may typically be a 45° angle, for example. Consequently, the original visual information is split into two identical, discrete parts or versions directed along axes at substantially right angles to each other.

If, then, a second channel of visual information is directed at the opposite face of the semi-reflective element, one-half of the energy will pass through to be combined with that portion of the light energy of the visual information contained in the first channel which was reflected from the same semi-reflective element.

In a similar manner, that portion of the light energy of the visual information of the second channel which is reflected becomes combined with that portion of the light energy of the visual information of the first channel which passed through the semi-reflective element. The total result is that two substantially identical combinations of visual information from both first and second channels are developed.

However, each of the combinations contain only approximately one-half of the light energy originally contained in each of the first and second channels of visual information. That type of prior art system is quite acceptable in performance if it is necessary to use both such identical combinations from the first and second channels, each comprising light energy of merely one-half amplitude or intensity, relative to the original light energy contained in each one of the channels. But in those systems in which it is only necessary to use one of the combinations of the visual information contained in both first and second channels, the second identical combination represents at least a 50 percent loss of light energy, for all practical purposes.

Accordingly, when there is a system requirement for combining visual information as may be contained in first and second channels and the utilization of such information in singular combined form, the use of conventional beam splitter techniques and optical elements has the inherent disadvantage of at least a 50 percent loss of the initial total light energy contained in the first and second channels which are to be combined. As a result, significantly increased amplitudes of light energy are required for the light energy inputs to such systems where beam splitter techniques are used for producing a single combined visual information originating in two different channels.

Accordingly, there is a need for an optical system which will effectively and efficiently combine visual information from several channels without the magnitude of light losses of the order of 50 percent which are typical of prior art equipments and practices employing beam splitter techniques and equipments. Those skilled and knowledgeable in the pertinent arts will readily appreciate that any significant improvement in efficiency by means of reducing light losses in systems where light losses are of the order of 50 percent is highly desirable and a significant contribution to the arts.

SUMMARY OF THE INVENTION

The concept of the present invention contemplates the use of first and second prisms preferably of a material which is substantially transparent to the type of light energy employed in the system in which the invention is to be practiced. The prisms may, for instance, be comprised of four faces orthogonally related relative to each other, with a fifth diagonal face of 45°, for example, with respect to two of the faces, and orthogonally related to the two remaining faces.

The first and second prisms are preferably positioned so as to define a common, diagonally disposed, planar interface which includes a very small space therebetween which may take the form of an air space, for instance. Appropriate spacers, such as shims, may be interposed between the diagonal planar faces of the first and second prisms to maintain a uniform and desirably dimensioned air space therebetween defining the interface between the two prisms which form a composite cubic optical element.

The composite cubic optical element is placed so that the first and second channels of visual information may be directed to it. Means is employed for directing visual information of the first channel to the composite cubic optical element at an angle which may be substantially orthogonal to one of its faces and at an angle relative to the diagonally disposed interface such that the light energy and the visual information contained therein passes through the optical element without reflection. Additional means is employed for directing the visual information of the second channel to an adjacent face of the cubic optical element but at an angle such that there is total internal reflection at the diagonally disposed planar interface between the two prismatic elements of the composite cubic optical element.

As a result, the visual information contained in both the first and second channels is directed along the same axis in a combined form. Because the concept of the present invention is such that it eliminates beam splitting, it also obviates the inherent losses of beam splitting which typically amount to substantially 50 percent or more of the light energy involved.

Accordingly, it is a primary object of the present invention to provide an optical system which will combine visual information from multiple channels with significantly less light losses than were typical of comparable prior art systems.

An equally important object of the present invention is to provide such an improved efficiency in an optical system for combining multiple channel visual information which is relatively simple and readily implemented by optical elements available in the present state of the art.

Yet another important object of the present invention is to provide such an optical system for combining visual information from first and second channels which is readily adaptable to use in a large screen projection system.

A further object of the present invention is to provide such an improved optical system for combining visual information from several channels with significantly increased efficiency and which is also adapted to employ the same light source for illuminating the visual information contained in the two channels.

A further object of the present invention is to provide an optical system for combining visual information of first and second channels where one of the channels involves static background visual information and the other involves dynamic information of constant change.

Yet another important object of the present invention is to provide such an optical system for combining visual information in which the dynamically changing information is derived from a photochromic source.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is a schematic diagram of a simplified version of the type of two channel optical elements used in typical prior art multi-channel optical systems;

FIG. 2 is a schematic diagram of the multi-channel optical system of the present invention.

In the prior art, beam splitter techniques and elements were typically employed in optical systems where it was necessary that visual information from several channels be combined into a single visual presentation such as at a single image plane, for example. FIG. 1 illustrates in simplified schematic fashion one form of such beam splitter element and beam splitter techniques. Visual information is available from a first channel 10 and similarly, a second or related visual information is available from a second channel 11. The semi-reflective element 12 may be positioned as shown at the intersection of the axis of the visual information from the first channel 10 with the axis of the visual information from the second channel 11, the beam splitter or semi-reflective element 12 being positioned conventionally at an approximate 45° angle. The nature of the beam splitter 12 is such that it is half reflective; that is to say, that the beam splitter 12, upon intercepting light energy, will reflect one-half of it and permit the remaining half to pass therethrough. Thus, when the visual information comprising light energy from the first channel 10 is intercepted by the beam splitter 12, half of the light energy is permitted to pass therethrough as indicated by the solid arrow 13, while the other half of the light energy comprising the visual information of the first channel 10 is reflected at a right angle as indicated by the dash arrow 14.

In a similar fashion, the light energy comprising the visual information of the second channel 11, when intercepted by the beam splitter 12, is partially reflected in an approximate amount of 50 percent of its amplitude as is indicated by the dash arrow 15. The remaining 50 percent of light energy of the second channel intercepted by the beam splitter 12 is passed through the beam splitter element 12 without substantial attenuation as is indicated by the solid arrow 16.

Thus, the beam splitter 12 and the configuration of prior art techniques and practices as illustrated in FIG. 1 demonstrates that visual information from the first channel 10 and the second channel 11 may be combined at a common image plane 17.

However, it should be carefully noted that virtually the same combination of information could be had by focusing the energies of one-half the light energy from the visual information of channel 10 as indicated by the dashed arrow 14, together with one-half of the light energies from the visual information of the second channel 11 as indicated by the solid arrow 16. Those skilled and knowledgeable in the art will immediately recognize that if the particular optical system requires dual combinations of such visual information, the beam splitter 12 employed as illustrated or any comparable beam splitter technique is an effective solution to the problem.

However, if only one combined presentation of visual information from both channels is required, it will be equally apparent to those skilled and knowledgeable in the art that all of the light energy represented by the dash arrow 14 and the solid arrow 16 is dissipated and lost in the system. Therefore, while such beam splitters and beam splitter techniques are reasonably effective in accomplishing the combining of two channels of visual information, they can also represent a relatively inefficient technique and equipment since virtually 50 percent of the light energy may be lost and does not effectively contribute to any useful purpose or end.

The concept and teachings of the present invention is such that substantially all the unwanted losses of light energy mentioned hereinbefore are eliminated so as to provide substantially a 100 percent improvement in the employment of light and in the efficiency of the system. That is to say, that the identical light source may be employed in the present invention as was used in the prior art type of beam splitter system, and give effect to an increase in the brightness of the visual information presented by a factor of two to one. Moreover, the present invention readily lends itself to an arrangement wherein a single light source may be employed to illuminate both first and second channels of visual information.

FIG. 2 illustrates a preferred embodiment of the present invention. A first channel of visual information is available from a source such as the cathode ray tube illustrated at 20; a second source of visual information is available from a substantially orthogonally disposed channel which may use a slide or map, such as is illustrated at 21. A most important element of the optical system illustrated in FIG. 2 is a composite, substantially cubical optical element comprised of two prisms 22 and 23. The prisms 22 and 23 may consist of suitable material permitting the maximum transmission of the wavelength of light energy involved in the particular system. Each of the prisms 22 and 23 may, in a preferred embodiment, comprise two square faces orthogonally disposed, relative to each other, together with two parallel triangular faces and a fifth diagonal face disposed at a 45° angle relative to the two square faces.

The first and second prisms 22 and 23 are positioned so as to define a common diagonally disposed planar interface 24 which preferably includes a very small air space therebetween. Any appropriate spacing means, such as shims, may be interposed between the diagonal planar faces of the first prism 22 and the second prism 23 to maintain a uniform and desirably dimensioned air space therebetween to define the interface between the two prisms which form the composite cubic optical element.

In the preferred embodiment of FIG. 2 the visual information from the first channel 20 and that from the second channel 21 is illuminated by the same source of light energy. The common source of light energy comprises a single lamp 25. A retro-reflector 26 directs light energy along an axis indicated at 27, through suitable condenser lens 28 and 29, to a heat absorption filter 30 which removes a substantial amount of the infrared wavelengths from the light energy.

The axis of the light energy 27 is such that it enters the face of prism 22 at an angle of approximately 5° divergent from an orthogonal direction. Because of the change of the index of refraction in the material of the prism 22, the divergent angle is changed slightly within the prism to approximately 3.4° relative to the orthogonal relationship. Accordingly, when the light energy generated along the axis 27 strikes the interface 24 between the prism elements 22 and 23, there is total internal reflection with virtually the entire amount of light energy emerging to illuminate the visual information of the first channel, which, in the illustrated embodiment, is derived from a cathode ray tube 20.

In one of the preferred embodiments of the present invention, the visual information is generated by a cathode ray tube having a phosphor layer 31 on its face and thence to bundled fiber optics 32 which in turn have a dichroic mirror 33 in position over the fiber optics. The piece of photochromic film 34 is then positioned next to the dichroic mirror.

In operation the cathode ray tube may write dynamic information by exciting particular portions of the phosphor 31 on its face and such visual information is carried by the fiber optics 32 to pass through the dichroic mirror 34, causing selective darkening of the photochromic film and depicting the specific content of dynamic information, such as tactical data which may be derived from radar systems, for example.

However, in a typical system the intensity of the beam of cathode ray tube energy may be employed for selectively darkening the photochromic material, rather than for generating illumination as ordinarily occurs in a cathode ray tube of the TV type. Accordingly, the photochromic film and the visual information contained thereon must be illuminated for purposes of presentation of that visual information.

Illumination is achieved by the light energy generated by lamp 25, then directed along the axis 27 by the retroreflector, and then redirected by total internal reflection at substantially right angles out of the composite optical element comprising prisms 22 and 23 so that it passes through the photochromic film and is reflected back from the dichroic mirror and thus generates an illuminated visual presentation.

The visual information contained on the photochromic film 34 thus illuminated is carried back by reflection to the composite cubic optical element comprising the prisms 22 and 23. However, the angle of incidence of the visual information of the first channel upon the interface 24 of the composite cubic optical element comprising prisms 22 and 23, is sufficiently diverse from the critical angle which would cause total internal reflection, that the light energy passes through the composite optical element without reflection and thence to a suitable projection lens assembly 35 for presentation as part of a multi-channel composite large screen display, for instance.

The second channel of visual information, in the preferred embodiment of the present invention as schematically depicted in FIG. 2, is preferably illuminated by the same light source in the form of lamp 25. A retroreflector 36 is positioned to direct light energy along an axis 37 at substantially right angles to the previously described light axis 27 which illuminated the visual information of the first channel. Appropriate condenser lens 38 and 39 are positioned along the axis 37 together with a relay lens 40. A suitable heat absorption filter may also be included in the described optical path, if desirable.

A periscope type of element 41, or an assembly of mirrors arranged to perform the comparable periscopic function, is employed to redirect the light energy from axis 37 downwardly and thence at a right angle underneath the projection lens assembly 35. A relay lens 42 directs the light energy to a mirror 43 which in turn redirects the light energy along an axis toward the source of the visual information for the second channel.

In this same axis, a second periscope or mirror assembly 44 is suitably disposed to redirect the light energy upwardly and laterally, generally along an axis directed to the composite cubic optical element comprising the prisms 22 and 23. A relay lens 45 directs the light energy which emerges from the periscopic assembly 44 to a map, slide, or similar type of visual information such as it may be desired to originate in the second channel.

In one application of the preferred embodiment of the present invention the second channel comprises static information such as may be found on a map or other non-changing source of information. This type of static information, when illuminated, may be directed along an axis 46 to enter the prism 23 of such an angle as to cause total internal reflection at interface 24. As a consequence, the visual information of the second channel source is redirected along the same axis 47 as the visual information which is emerging from the first channel source by reason of the illumination of the photochromic film 34. The combined visual information from both channels then passes through the projection lens assembly 35 for composite presentation at a suitable image plane such as in a large screen display, for example, shown at 48 in FIG. 2.

Since the concept of the present invention inherently requires total internal reflection of light energies within the composite cubic optical element comprising prisms 22 and 23, there is little or no loss of light energy by reason of unwanted, unnecessary dissipation of light energy as was common to many prior art systems and techniques.

Those skilled and knowledgeable in the pertinent arts will readily recognize that the present invention offers an inherent 400 percent increase in efficiency in the photochromic channel over the conventional beamsplitter in the two channel projector shown schematically in FIG. 2. This significant increase is due in part to the 100 percent total internal reflection of the incident illumination by the diagonal surface of the cube compared with a 50 percent reflection in a conventional beamsplitter. The remaining increase is due to the light reflected from the photochromic film and faceplate of the cathode ray tube being substantially entirely transmitted back through the diagonal surface of the cube at less than total internal reflection angle. Thus, the transmitted efficiency is substantially 100 percent compared with 50 percent for the conventional beam splitter. The resulting total efficiency of the proposed invention operated in the prescribed fashion is substantially 100 percent compared with a product of the 50 percent efficiency for the incident illumination and the 50 percent efficiency for the transmitted illumination for the conventional beam splitter. Thus, the overall efficiency of the inventive concept is substantially 100 percent compared with 25 percent for the conventional beam splitter. This implies a four-to-one improvement in illumination efficiency in the proposed invention over the conventional beam splitter and is a significant improvement and a most valued and noteworthy contribution to the art.

Obviously many modifications and variations of the present invention are possible in the light of the above teachings. It is therefore to be understood that within the scope of the appended claims the invention may be practiced otherwise than as specifically described.

What is claimed is:

1. An optical system for combining different visual information contained in separate first and second channels having intersecting, substantially orthogonally disposed first and second axes, respectively, into a single composite image comprising:

first and second prisms of material substantially transparent to light transmission, said prisms being positioned in a common, diagonally disposed, planar interface at the intersection of said axes to form a composite cubic optical element with said planar interface at an angle of 45° relative to each of said axes;

a source of light energy disposed substantially opposite the visual information of said second channel;

means for directing said light energy along a path substantially at an angle of 5° relative to said second axis for total internal reflection at said planar interface and right angular redirection to illuminate the visual information image of said first channel;

reflective means positioned to reflect the illuminated visual information image of said first channel back through said cubic optical element for non-reflective passage therethrough along said first axes; and means for directing the visual information of said second channel to said cubic optical element at an angle of the order of 5° relative to said second axis for total internal reflection at said planar interface and right angular redirection along the path of said first axis for combination with said visual information from said first channel within a single image area at a common image plane.

2. An optical system for combining visual information of first and second channels as claimed in claim 1 wherein said interface comprises an air space.

3. An optical system for combining visual information as claimed in claim 1 and including optical means for directing light energy from said source in a folded path around said first axis and said composite cubic optical element for illuminating the visual information of said second channel.

4. An optical system for combining visual information as claimed in claim 1 wherein said visual information source of said first channel includes a photochromic element.

5. An optical system for combining visual information as claimed in claim 4 wherein said reflective means comprises a dichroic mirror.

6. An optical system for combining visual information as claimed in claim 4 wherein said photochromic element comprises translucent photochromic film responsive to ultra violet energy for depicting visual information.

* * * * *